United States Patent [19]

Mehansho et al.

[11] Patent Number: 5,118,513

[45] Date of Patent: Jun. 2, 1992

[54] METHOD FOR ENHANCING BIOAVAILABILITY OF IRON-CALCIUM MINERAL SUPPLEMENTS

[75] Inventors: Haile Mehansho, Fairfield; Kenneth T. Smith, Cincinnati, both of Ohio

[73] Assignee: The Procter & Gamble Company, Cincinnati, Ohio

[21] Appl. No.: 568,118

[22] Filed: Aug. 16, 1990

Related U.S. Application Data

[60] Division of Ser. No. 287,700, Dec. 20, 1988, Pat. No. 4,994,283, which is a continuation-in-part of Ser. No. 69,359, Jul. 2, 1987, abandoned.

[51] Int. Cl.⁵ ............................................. A23L 1/304
[52] U.S. Cl. ........................................ 426/2; 426/74; 426/590; 426/599; 424/439; 424/647; 424/648; 514/502; 514/905
[58] Field of Search ............... 426/74, 531, 549, 590, 426/599, 648, 656, 72, 2; 424/147, 154, 153; 514/502, 905

[56] References Cited

U.S. PATENT DOCUMENTS

| | | | |
|---|---|---|---|
| 3,992,555 | 11/1976 | Kovacs | 426/73 |
| 3,992,556 | 11/1976 | Kovacs | 426/74 |
| 4,214,996 | 7/1980 | Buddemeyer | 426/74 |
| 4,283,423 | 8/1981 | Watkins | 426/74 |
| 4,351,735 | 9/1982 | Buddemeyer | 426/74 |
| 4,725,427 | 2/1988 | Ashmead | 426/591 |
| 4,786,510 | 11/1988 | Nakel | 426/599 |
| 4,786,518 | 11/1988 | Nakel | 426/74 |

OTHER PUBLICATIONS

Metrevely, E. G., "Latent Iron Deficiency and Effect of Prophylacticl Administration of Medicamentous Iron on the Red Blood Composition of Healthy Young Children" *Pediatriyc (Moscow) 1977, vol. 12, pp. 17-19*.

Pollack, S. et al., "Iron Absorption: Effects of Sugars and Reducing Agents", Blood, 24 (5), pp. 577-581 (1964).

Davis, P. S. et al., "Effect of Orally Administered Chelating Agents EDTA, DPTA and Fructose on Radioiron Absorption in Man", Australas Ann. Med., 16, pp. 70-77 (1967).

*Primary Examiner*—Carolyn Paden
*Attorney, Agent, or Firm*—Rose Ann Dabek; Leonard W. Lewis; Jerry J. Yetter

[57] ABSTRACT

Nutritional mineral supplements comprise iron compounds and calcium compounds in combination with citrates of tartrates, ascorbates, and, optionally, fructose. The tendency of calcium to inhibit the bio-availability is reduced in such compositions, so that conjoint bioavailability of these two important minerals is enhanced.

8 Claims, No Drawings

METHOD FOR ENHANCING BIOAVAILABILITY OF IRON-CALCIUM MINERAL SUPPLEMENTS

This is a division of application Ser. No. 07/287,700, filed on Dec. 20, 1988, now U.S. Pat. No. 4,994,283 which is a continuation-in-part of application Ser. No. 07/69,359 filed Jul. 2, 1987, now abandoned.

The present invention relates to nutritious mineral supplements which contain both iron compounds and calcium compounds, and methods for preventing the negative interaction between iron and calcium when conjointly administered in such supplements.

BACKGROUND OF THE INVENTION

Vitamin and mineral supplements for human and veterinary use are commonplace. Recently, it has become recognized that certain groups of the human population may require quite high intakes of minerals, such as calcium, to prevent or alleviate certain disease states, for example, osteoporotic conditions. The medical management of certain anemias can be handled rather well by increasing the daily intake of iron. Some diets, or heavy physical exercise, may require the intake of considerable quantities of minerals apart from those generally obtained through what otherwise would be considered a balanced diet.

Mineral supplements, such as those commercially available, are useful in many circumstances where enhanced mineral uptake is desirable. However, adhering to a regimen which requires the separate intake of mineral supplements can give sub-optimal results, simply because the regimen requires a change in the normal habits and practices of the user. It would be more convenient if the minerals could be administered conjointly, so that they would be ingested without extra attention, planning and implementation on the part of the user.

It is particularly difficult to formulate mixtures of calcium supplements and iron supplements, inasmuch as these minerals tend to interact, which undesirably affects their nutritional bioavailability.

The depression of iron absorption by high levels of calcium was recognized as early as 1940. Since then, various groups have repeatedly confirmed the significant inhibition of iron absorption by calcium. Adverse effects of calcium, including decrease in hemoglobin regeneration, reduced whole body iron retention and delayed restoration of tissue and blood iron levels have been reported. In postmenopausal women, calcium supplements, namely, calcium carbonate and calcium hydroxyapatite, markedly reduced iron absorption. In addition, calcium carbonate in prenatal multivitamin mineral supplement was identified as an inhibitor absorption in nonpregnant women. Thus, individuals that consume high calcium and marginal amounts of iron simultaneously could develop iron deficiency anemia. See: Kletzein, S. W. (1940). Iron Metabolism. *J. Nutr.* 19, 187–97; Chapman, D. G. and Campbell, J. A. (1957). Effect of Calcium and Phosphorus Salts on the Utilization of Iron by Anemic Rats. *Br. J. Nutr.* 11, 127–133; Dunn, J. A. (1968). The Effects of Dietary Calcium Salts and Fat on Iron Absorption in the Rats. *S. Afr. J. Med. Sci.* 33, 65–70; Barton, J. C., Conrad, M. E. and Parmley, R. T. (1983). Calcium Inhibition of Inorganic Iron Absorption in Rats. *Gastroenterology* 84, 90–101; Dawson-Hughes, B., Seligson, F. H. and Hughes, V. A. (1986). Effects of Calcium Carbonate and Hydroxyapatite on Zinc and Iron Retention in Postmenopausal Women. *Am. J. Clin. Nutr.* 44, 83–88; and Seligman, P. A., Caskey, J. M., Frazier, J. L., Zucker, R. M., Podell, E. R. and Allen, R. M. (1983). Measurement of Iron Absorption from Prenatal Multivitamin Supplements. *Obstetrics and Gyn.* 61, 356–362.

It would be desirable, therefore, to have mixed calcium and iron supplements which are compatible and nutritionally available.

It is an object of the present invention to provide iron-plus-calcium mineral supplements which fulfill these unmet needs.

It is a further object of this invention to provide a method for fortifying foods, beverages and mineral supplement compositions with both iron and calcium.

These and other objects are secured herein, as will be seen from the following disclosure.

BACKGROUND ART

In addition to the above cited references, the following publications provide additional perspective on mineral supplementation.

For many decades orange juice has been recognized as an enhancer to iron absorption. Orange juice consumed with a typical western type breakfast reportedly increased iron bioavailability by 2.5-fold. In an in vitro system, addition of orange juice to breakfast meals and cooked pinto beans reportedly caused a dramatic increase in iron solubility. According to Rossander, et al, the reduction of iron absorption by tea was alleviated by orange juice. See: Lynch, S. R. and Cook, J. D. (1980), Interaction of Vitamin C and Iron. *Annals New York Academy of Sciences*, 32–44; Rossander, L., Hallberg, L. and Bjorn-Rasmussen, E. (1979), Absorption of Iron from Breakfast Meals. *Am. J. Clin. Nutr.* 32, 2484–2489; Carlson, B. L. and Miller, D. D. (1983), Effects of Product Formulation, Processing and Meal Composition on In Vitro Estimated Availability from Cereal Containing Breakfast Meals. *J. Food Sci.* 48, 1211–1216; and Kojima, N., Wallace, D. and Bates, W. G. (1981), The Effects of Chemical Agents, Beverages and Spinach on the In Vitro Solubilization of Iron from Cooked Pinto Beans. *Am. J. Clin. Nutr.* 34:1392–1401.

See, also, the nutritional literature: Ting, S. V. (1980). *Nutrients and Nutrition of Citrus Fruits* in "Citrus Nutrition and Quality" (edit. Nagy, S. and Attaway, J.). Amer. Chem. Soc., pp. 3–24; Gillooly, M., Bothwell, T. M., Torrace, J. D., MacPhail, A. P., Derman, D. P., Bezwoda, W. R., Mills, W. and Charlton, R. W. (1983). The Effects of Organic Acids, Phytates and Polyphenols on the Absorption of Iron from Vegetables. *Br. J. Nutr.* 49, 331–342; Hallberg, L. and Rossander, L. (1984). Improvement in Iron Nutrition in Developing Countries: Comparison of Adding Meat, Soy Protein, Ascorbic Acid, Citric Acid and Ferrous Sulfate on Iron Absorption for a Simple Latin American Type of Meal. *Am. J. Clin. Nutr.* 39; 577–583; and Kelly, S. E., Chawla-Singh, K., Sellin, J. M., Yasillo, N. J. and Rosenberg, I. M. (1984). Effects of Meal Composition on Calcium Absorption: Enhancing Effect of Carbohydrate Polymer *Gastroenterol.* 87, 596–600.

In addition to the foregoing, various mineral supplements, including iron supplements and calcium supplements, are described in the following references.

Certain forms of calcium citrate-malate are disclosed for use as mineral supplements, including beverages; see Japanese Application Sho 54-173172, date of application Dec. 28, 1979, laid-open Sho 56-97248, Aug. 5, 1981; and see also French Patent 2,219,778 (Application 73.08643).

Some form of iron sucrate has been administered to children and the effect on Hb reported; see the Russian reference Metreveli, E. G., *PEDIATRIYA* (Moscow) 1977, (12), 17–19; C. Abs. 89:637.

*Remington's Pharmaceutical Sciences*, 15th Ed., 393 (1975) indicates that ferrous and ferric ions form soluble coordination complexes with many agents such as ammonium salts, citrates, tartrates, amines, sugar and glycerine, which protect the iron from precipitation by the usual iron precipitants. Iron gluconate and fumarate salts are said to be employed as hematinics.

Goodman and Gilman, *The Pharmacological Basis of Therapeutics*, 5th Ed., 1315–1316 (1975) reports that iron salts have many incompatibilities and should be prescribed alone, preferably between meals, for maximal absorption, but just after meals if necessary to minimize gastric symptoms. Gastrointestinal absorption of iron is reportedly adequate and essentially equal from the following six ferrous salts: sulfate, fumarate, gluconate, succinate, glutamate, and lactate. Absorption of iron is lower from ferrous citrate, tartrate, pyrophosphate, etc. Reducing agents such as ascorbic acid and some chelating agents such as succinic acid may increase absorption of iron from ferrous sulfates, but are said to be not worth the extra cost because of the high efficacy of ferrous sulfate when administered alone. Ferrous sulfate is reported to have a saline, astringent taste, and is mixed with glucose or lactose to protect it against oxidation, when used as an iron supplement.

European Patent 164,657 to Pfeiffer and Langden relates to an iron dextran, which is obtained by adding precipitated ferric hydroxide to dextran produced by adding sucrose solution to a solution of D-glucose and dextran-sucrose enzyme.

U.S. Pat. No. 4,582,709, to Peters and Derick, Apr. 15, 1986, relates to chewable mineral supplements, and lists, inter alia, various calcium and iron compounds.

U.S. Pat. No. 4,351,735, to Buddemeyer, et al, Sep. 28, 1982, relates to mineral supplements which contain certain phosphate moieties. Dispersibility of the compositions is said to be enhanced by "hydroxyl sources", e.g., sugars.

U.S. Pat. No. 4,214,996, to Buddemeyer, et al. Jul. 29, 1980, relates generally to the same subject matter as the '735 patent, above, but claims, inter alia, iron compositions and calcium compositions.

The beneficial effect of orange juice on the uptake of iron from dietary sources is described by Carlson and Miller in JOURNAL OF FOOD SCIENCE 48, 1211 (1983).

U.S. Pat. No. 2,325,360, to Ayres et al, issued Jul. 27, 1943, discloses a method for replacing gases removed during deaeration of fruit juices, such as orange juice, with carbon dioxide. In this method, dry calcium carbonate, or a mixture of calcium carbonate and citric acid, is dropped into a can which is then filled with deaerated orange juice. (Other organic acids such as malic and tartaric acid can be used in place of citric acid.)

U.S. Pat. No. 3,657,424, to Akins et al, issued Apr. 18, 1972, discloses the fortification of citrus juices, including orange juice, with sodium, calcium and chloride ions in amounts beyond what is naturally present in the juice. Calcium salts which can be used in fortification include the chlorides, citrates or phosphates, although calcium chloride is preferred for providing the desired chloride ion.

U.S. Pat. No. 3,114,641, to Sperti et al. issued Dec. 17, 1963, discloses extended orange juice products obtained by diluting single-strength orange juice or concentrated orange juice. To maintain the flavor of the diluted orange juice product, materials such as calcium chloride, magnesium chloride, sodium or potassium citrates, tartaric and malic acids (or their salts) are included.

British Patent Specification 2,095,530, published Oct. 6, 1982, discloses a process for obtaining an acid beverage enriched in protein, particularly a fruit juice or fruit-flavored beverage. In this process, an aqueous suspension of soy protein is prepared using water and/or fruit juice. Calcium in a concentration of from 5 to 50 mM is added, after which the pH of the suspension is reduced and the insoluble material separated to yield a protein solution. A fruit juice or fruit flavoring can then be added to this protein solution. The calcium can be added in the form of the chloride, acetate, tartrate, malate or lactate salt.

European Patent Application 75,114, published Mar. 30, 1983, discloses protein-containing fruit juice drinks enriched with vitamins and minerals. These drinks contain 30–90% fruit juice (a mixture of 20–70% apple juice, 4–40% white grape juice, 1–10% passionfruit juice and 5–25% lemon juice), 2 to 20% whey protein concentrate, and a mineral salt mixture of potassium, sodium, magnesium, calcium and phosphate. Calcium is present in these drinks at 0.01 to 0.3%, preferably at 0.02 to 0.03%.

SUMMARY OF THE INVENTION

The present invention encompasses methods for enhancing the bioavailability of conjointly-administered iron and calcium in a human or lower animal, comprising co-administering a nutritional amount of a source of calcium and a source of iron with a potentiating amount of citrate or tartrate, or mixtures thereof, and optionally with ascorbate. The invention thus provides a means for formulating calcium supplements that do not interfere with iron supplements by using citric or tartaric acid, optionally with ascorbic acid in combination with the calcium and iron source.

The iron sources used herein are preferably those wherein the iron is in the II oxidation state. However, iron III can also be used. Preferably, the iron source is a member selected from the group consisting of iron II sulfate or an iron II sugar complex, especially iron sucrate-malate, iron fructate-malate, iron sucrate-citrate, iron fructate-citrate, iron sucrate-ascorbate, iron fructate-ascorbate, and mixtures thereof.

The calcium source used herein can be, for example, a member selected from the group consisting of calcium carbonate, calcium oxide, calcium hydroxide, calcium chloride, calcium phosphate, and calcium citrate malate. Calcium citrate malate is especially preferred.

Methods according to this invention wherein the calcium source is calcium citrate malate and wherein the iron source is an iron sugar complex, especially Fe II, are most preferred, both from the standpoint of organoleptic quality and bioavailability.

In a preferred mode, the invention is carried out with the conjoint administration of fructose.

The invention also encompasses compositions of matter for conjointly administering iron and calcium to a human or lower animal comprising, in unit dosage form, a mixture of: i) an iron mineral source; ii) a calcium mineral source: iii) citrate or tartrate. or mixtures thereof: iv) optionally, but preferably, ascorbate; and, v) optionally, fructose.

The invention also provides means for preparing food and beverage compositions. For example. in the manner of this invention, a fortified, apple juice-based composition, comprises i) apple juice: ii) iron source; iii) calcium source: iv) citrate or tartrate; v) ascorbate; and vi) fructose. Other juice products which have low, or no, citric/ascorbic acid levels, e.g., pear juice and pineapple juice, can be fortified with iron and calcium in the manner of this invention by the addition of citric/ascorbic acids, or tartaric/citric/ascorbic acids.

As will be disclosed more fully hereinafter, the mineral supplements of this invention can conveniently be used in powder, tablet, chewable lozenge, capsule or liquid form, for enteral or parenteral nutrition, and in combination with conventional foodstuffs, such as breads, cakes, snacks, infant formulations, meat analogs and extenders, spreads, and the like.

All ratios, proportions and percentages herein are by weight, unless otherwise specified.

DETAILED DESCRIPTION OF THE INVENTION

The present invention involves the conjoint use of nutritionally-supplemental amounts of iron and calcium compounds in humans and lower animals in combination with potentiating amounts of citrates, tartrates, ascorbates, or mixtures thereof, and. optionally, fructose.

By "nutritional" or "nutritionally-supplemental amount" herein is meant that the mineral sources used in the practice of this invention provide a nourishing amount of said minerals. In mineral supplements such as tablets or powders, this supplemental amount will comprise at least 3% of the Recommended Daily Allowance (RDA) of the daily intake of said mineral, as defined in The United States of America (see Recommended Daily Dietary Allowance-Food and Nutrition Board, National Academy of Sciences-National Research Council). More generally, mineral supplements will contain at least 10%, more typically 50% to 300%, of the RDA per unit dose of the supplement. In food or beverage products of the type disclosed herein, the nutritionally supplemental amount will generally comprise more than 3% of the RDA, preferably 10%–100% RDA, most preferably 10%–30% of the RDA, per unit portion of the food or beverage product. Of course, it is recognized that the preferred daily intake of any mineral may vary with the user. For example, pregnant, lactating, or post-menopausal females may require an increased intake of calcium, over the usual RDA. Persons suffering with anemia may require an increased intake of iron. Such matters are familiar to physicians and nutritional experts, and usage of the compositions of the present invention may be adjusted accordingly.

In general, the RDA (calcium) will range from 360 mg per 6 Kg for infants to 1200 mg/54-58 Kg female, depending somewhat on age. The RDA (iron) ranges from 10 mg per 6 Kg to 18 mg per 54-58 Kg female, depending somewhat on age. As is well-known, it is possible to overdose with iron supplements, especially in males, with deleterious effects to the liver. Typically, foods and beverages are supplemented with only about 10-15% RDA iron (based per serving) to account for iron which is available from other dietary sources (assuming a reasonably balanced diet), thereby avoiding this problem. Moreover, it can be difficult to supplement beverages with more than 20-30% RDA of calcium (based per serving) without encountering precipitation and/or organoleptic problems. However, this level of supplementation is equivalent to cow's milk in calcium value, and is quite acceptable. Of course, if iron toxicity and organoleptic quality are not deemed important considerations in individual circumstances, more of the supplements herein can be used.

Potentiators

It has now been determined that certain materials act as "potentiators", which enhance the bioavailability of calcium. Fructose is one such potentiator, and other carbohydrates, such as sucrose, function similarly, albeit less well than fructose.

However, iron bioavailability is impaired by the administration of calcium, and this impairment remains, even in the presence of usually-found levels of carbohydrates, including fructose.

It has now been found that citric acid (or citrates) and tartaric acid (or tartrates) partially alleviate calcium's inhibitory effect on iron, and mixtures of citric/ascorbic acid (or citrate/ascorbate mixtures), or tartaric acid/ascorbic acid (or tartrate/ascorbate) or mixtures, do overcome the inhibitory effect.

Accordingly, the practice of this invention involves use of a potentiating amount of citrate: or, preferably, citrate/ascorbate; or. citrate/fructose; or, citrate/ascorbate/fructose or tartrate/ascorbate, or similar mixtures with fructose and/or citrate, to potentiate iron and calcium bioavailability when these minerals are administered conjointly.

By "potentiating amount" of the citrate, tartrate, ascorbate, carbohydrate (especially fructose), and mixtures thereof, materials used herein is meant an amount sufficient to enhance uptake and bioavailability of iron and calcium when administered to humans or lower animals. Of course, even small amounts of these potentiators have some beneficial effect. However, it is preferred to use sufficient potentiator to provide bioavailability levels of the iron/calcium mixtures which are essentially equivalent to iron and calcium supplements when administered separately, and several hours apart. Fortunately, the potentiators used herein are entirely safe for consumption, so there is essentially no upper limit to the amount that can be safely ingested. Moreover, in practical terms, the potentiators are inexpensive, so there is no need for the formulator to carefully balance benefit/cost ratios. Typically, then, the citrate, tartrate and ascorbate potentiators are used in a weight ratio with the minerals (calculated as iron and calcium per se, discounting associated ions or ligands) of potentiator:mineral ranging from 1000:1 to 1:3, generally 3:1 to 1:1. The fructose potentiator may be used in much higher ratios, say, $10^6:1$, since the formulator may also find it useful to include fructose, not only for its potentiating effect, but also for its bulk sweetener effect.

Iron

The iron compounds used in the practice of this invention can be any of the well-known iron supplements, including ferric chloride, ferrous sulfate, ferrous gluconate, ferrous lactate, ferrous tartrate, and the like. Iron-sugar complexes are preferred for use herein, by virtue of their organoleptic qualities, their high bioavailability, and their compatability with calcium, when used in the manner of this invention.

The "iron-sugar" complexes preferred for use in the practice of this invention are prepared in the manner described more fully hereinafter. (These materials are referred to herein as "complexes", but they may, in fact, exist in solution as complicated, highly hydrated, protected colloids.) The iron complexes used herein can be in the ferric (iron III) state, but it is more preferably in the ferrous (iron II) state. Ferrous iron is better tolerated and utilized by the body than ferric iron. Importantly, ferric iron and common ferrous salts can cause off-flavors in some beverages, after storage; ferric iron can also degrade ascorbic acid (Vitamin C) in citrus beverages. The preferred complexes used herein can conveniently be thought of as iron-sugar-carboxylate complexes, wherein the carboxylate provides the counterion for the ferrous (preferred) or ferric iron. While not intending to be limited by theory, it is believed that the acceptable taste of these iron complexes is due to the relatively large sizes of the sugar moiety and carboxylate counterion, which mask the usual "well-water" and/or brackish flavor of some iron supplements.

The overall synthesis of the preferred iron-sugar-carboxylate complexes used in the practice of this invention involves:

a) forming a calcium-sugar moiety in aqueous media, for example, by reacting calcium hydroxide with a sugar;

b) reacting an iron source, such as ferrous ammonium sulfate, with the calcium-sugar moiety in aqueous media to provide an iron-sugar moiety; and c) neutralizing the reaction system with a carboxylic acid, for example, malic acid, to provide the desired iron-sugar complex.

The preferred iron II-sucrate-malate complex prepared in this manner is essentially equivalent to ferrous sulfate in iron bioavailability (measured as % change in hematocrit of test animals over the range of 0–9 ppm Fe), and, most importantly, is organoleptically acceptable in beverages, especially citrus beverages.

The "sugars" which can be employed in the practice of this invention include any of the ingestible saccharidic materials, and mixtures thereof, well-known in the culinary arts. For example, glucose, sucrose and fructose can conveniently be employed, with sucrose and fructose being the more preferred. However, other saccharidic materials can be used, for example mannose, galactose, lactose, maltose, and the like.

The "carboxylate counterion" used in the preparation of the preferred iron-sugar complexes herein can be any ingestible carboxylate species. However, some judgment must be made with regard to flavor contribution. For example, citrate, malate and ascorbate yield ingestible complexes whose flavors are judged to be quite acceptable, particularly in fruit juice beverages. Tartaric acid is acceptable, particularly in grape juice beverages, as is lactic acid. Longer-chain fatty acids may be used in solid mineral supplements, but can affect flavor and water solubility. For essentially all purposes, the malate (preferred), citrate and ascorbate moieties suffice, although others can be selected, according to the desires of the formulator.

In a less preferred mode, the counterion for the iron-sugar complex can be noncarboxylate moieties such as phosphate, chloride, sulfate, or the like. However, such counterions can undesirably interact with calcium ions, especially in beverages. In high concentrations, these counterions may contribute an undesirable flavor note. Accordingly, the carboxylate counterions noted above are preferred herein.

Calcium

The calcium compounds used in the practice of this invention can be any of the well-known calcium supplements, including calcium carbonate, calcium oxide, calcium hydroxide, calcium apatite, and the like. Calcium citrate-malate is preferred for use herein, by virtue of its organoleptic qualities, high bioavailability and compatability with iron, when used in the manner of this invention.

The preparation of calcium citrate-malate is described hereinafter in Example I.

Examples I–VIII, hereinafter relate to the syntheses of preferred iron and calcium compounds used in the practice of this invention. Examples VIII–XX relate to methods and compositions provided by the invention, but are not intended to be limiting.

EXAMPLE I

Preparation of Calcium Citrate-Malate

A calcium citrate-malate solution is prepared by dissolving 2 parts sucrose and then 0.1 part citric and 0.28 part malic acids in 28.19 parts water. Calcium hydroxide (0.22 part) is added and the mixture is agitated. This solution can be used directly to prepare beverages, or can be freeze-dried to use in solid mineral supplements.

EXAMPLE II

Iron II Sucrate-Malate

Sucrose (684 g; 2 moles) is dissolved in water (2399g), making sure all sugar is dissolved. Calcium hydroxide (148 g; 2 moles) is added to the sugar-water and stirred for 5 minutes. The solution is filtered through a glass filter.

To the calcium-sucrate solution prepared in the foregoing manner is added iron II ammonium sulfate (196 g; 0.5 moles) and the solution is covered air-tight with SARAN WRAP. The color should remain green, showing that the iron is in the desired II oxidation state. Malic acid (268 g; 2 moles) is added to the solution, in three batches. At each point of addition, a pH reading is taken with litmus paper to insure pH 3-4. The precipitate is filtered-off through a paper filter, but the filter cake comprising calcium sulfate is not rinsed. The resulting solution comprises the iron II sucrose-malate used in the practice used per se, or can be freeze-dried to provide the iron sucrose-malate in powder form.

Variations in the method for preparing iron-sugar complexes, as well as alternate sugars and counterions, are given in the following examples.

EXAMPLE III

Iron II Fructate-Malate

Fructose (360 g; 2 moles) is dissolved in water (1644 g), making sure all fructose is dissolved. Calcium hydroxide (148 g; 2 moles) is added to the fructose solution and stirred for 5 minutes. The solution is filtered through a glass filter.

To the calcium fructose solution is added iron II ammonium sulfate (196 g; 0.5 mole) and the solution is covered air-tight with SARAN WRAP. The color should remain green. Malic acid (268 g; 2 moles) is added in three batches. At each addition, a pH reading is taken with litmus paper to insure pH 3-4. The precipitate is filtered off (paper filter). The title compound is in the filter liquor.

EXAMPLE IV

Iron II Sucrate-Citrate

Sucrose (684 g; 2 moles) is dissolved in water 2399 g), making sure all sugar is dissolved. Calcium hydroxide (148 g; 2 moles) is added to the solution and stirred for five minutes. The solution is filtered through a glass filter. To the calcium-sucrate solution is added iron II ammonium sulfate (196 g; 0.5 mole) and the solution is covered air-tight with SARAN WRAP. The green color should persist. Citric acid (384 g; 2 moles) is added to the reaction mixture in three batches. At each point of addition, a pH reading is taken with litmus paper to insure pH 3-4. The precipitate is filtered-off (paper filter) and the filter cake is not rinsed. The title compound is in the filter liquor.

EXAMPLE V

Iron II Sucrate-Tartrate

Sucrose (684 g; 2 moles) is dissolved in water (2399 g), making sure all sugar is dissolved. Calcium hydroxide (148 g; 2 moles) is added to the sugar solution and stirred for 5 minutes. The solution is filtered through a glass filter.

To the calcium-sucrate solution is added iron II ammonium sulfate (196 g; 0.5 mole) and the solution is covered air-tight with SARAN WRAP. The green color should persist. Tartaric acid (300 g; 2 moles) is added to the solution in three batches. At each time of addition, a pH reading is taken with litmus paper to insure pH 3-4. The precipitate is filtered (paper filter) and removed; the filter cake is not rinsed. The title compound is in the filter liquor.

EXAMPLE VI

Iron II Glucate/Fructate-Malate

Glucose (360 g; 2 moles) and fructose (360 g; 2 moles) are co-dissolved in water (1643 g), making sure all sugar is dissolved. Calcium hydroxide (148 g; 2 moles) is added to the sugar-water and stirred for 5 minutes. The solution is filtered through a glass filter.

To the calcium/mixed sugars solution is added iron II ammonium sulfate (196 g; 0.5 moles) and the solution is covered air-tight with SARAN WRAP. The green color should persist. Malic acid (268 g; 2 moles) is added in three batches. At each addition, a pH reading is taken with litmus to insure pH 3-4. The precipitate is filtered-off (paper filter) and the filter cake is not rinsed. The title compound is in the filter liquor.

EXAMPLE VII

Iron II Sucrate-Citrate/Ascorbate

Sucrose (684 g; 2 moles) is dissolved in water (2399 g), making sure all sugar is dissolved. Calcium hydroxide (148 g; 2 moles) is added to the sugar water solution and stirred for 5 minutes. The solution is filtered through a glass filter.

To the calcium-sucrate solution is added iron II ammonium sulfate (196 g; 0.5 mole) and the solution is covered air-tight with SARAN WRAP. The green color should persist. The citric acid (192 g; 1 mole) is first added to the solution, then the ascorbic acid (352 g; 2 moles) is added in three batches. At each time of addition, a pH reading is taken with litmus paper to insure pH 3-4. The precipitate is filtered (paper filter). The title compound is in the filter liquor.

EXAMPLE VIII

Iron II Fructate Malate

Fructose (541 g; 3 moles) is dissolved in water (1672 g), making sure all is dissolved. Calcium hydroxide (37 g; 0.5 moles) is added and stirred for 5 minutes. The solution is filtered through a glass filter.

To the calcium-fructose solution is added iron II sulfate, (139 g; 0.5 mole) and the solution is covered air-tight with SARAN WRAP. The color should remain green. Malic acid (67 g; 0.5 moles) is added to the solution in three batches. At each addition, a pH reading is taken with litmus paper to insure pH 3-4. The precipitate is filtered-off (paper filter) and the filter cake is not rinsed. The title compound is in the filter liquor.

EXAMPLE IX

Iron- and calcium-fortified chewable lozenges comprise:

| Ingredient | Amount |
|---|---|
| Iron II sucrate-malate | 20 mg |
| Calcium citrate-malate | 500 mg |
| Sodium citrate | 10 mg |
| Fructose | 5 g |
| Sodium ascorbate | 7 mg |
| Fruit flavor* | 6 mg |
| Color | As desired |

The lozenge of Example IX is prepared by mixing the ingredients and compacting the mixture in a standard press.
*Fruit flavors used herein generally comprise synthetically reconstituted flavor esters. In this example, pineapple flavor is used, and comprises a synthetic mixture of ethyl acetate, acetaldehyde, methyl n-valerate, methyl i-valerate, methyl i-caproate and methyl caprylate.

EXAMPLE X

Iron- and calcium-fortified apple juice comprises:

| Ingredient | Amount |
|---|---|
| Iron II sucrate-malate | 15 mg |
| Calcium citrate-malate | 300 mg |
| Citric acid | 20 mg |
| Sodium ascorbate | 10 mg |
| Fructose | 150 mg |
| Apple juice | 150 g |

The calcium citrate-malate (aqueous solution form; per Example I) and iron II sucrate-malate (aqueous solution form; per Example II) are prepared. The sodium citrate, sodium ascorbate and fructose are dissolved in the apple juice, to which is then added the iron and calcium solutions.

EXAMPLE XI

A mineral supplement powder in unit dose form is as follows:

| Ingredient | Amount |
|---|---|
| Ferrous sulfate | 35 mg |
| Calcium carbonate | 1000 mg |
| Sodium tartrate | 25 mg |
| Sodium ascorbate | 50 mg |

The powder is provided in a soluble gelatin capsule for oral ingestion.

EXAMPLE XII

A powdered mineral supplement comprises 2,000 mg calcium carbonate, 15 mg iron (II) fructate-malate (prepared in the manner of Example VIII), 25 mg sodium citrate, 25 mg sodium tartrate, and 25 mg ascorbic acid. The composition is suitable for daily ingestion to provide calcium and iron supplementation, conjointly.

EXAMPLE XIII

A powdered mineral supplement suitable for dispersion in water or other potable liquid, comprises: 15 mg ferric chloride; 1000 mg calcium citrate-malate; 50 mg sodium citrate and 50 mg sodium ascorbate.

EXAMPLE XIV

The composition of Example XIII is modified by adding 500 mg of fructose, to further enhance mineral bioavailability.

EXAMPLE XV

A fortified beverage suitable for oral administration, including administration under stress conditions such as illness, heavy physical exertion or pregnancy, comprises:

| Ingredient | Amount |
|---|---|
| Fructose | 3 g |
| Soy hydrolysate | 25 g |
| Iron II fructose-ascorbate | 50 mg |
| Calcium citrate-malate | 1500 mg |
| Sodium citrate | 250 mg |
| Sodium ascorbate | 250 mg |
| Multivitamin supplement* | 300 mg |
| Aqueous 30% dextrose | 250 g |
| Flavor | As desired |

*Comprising 100% RDA of Vitamins D, E, A. Vitamin K may be included if blood clotting is a consideration.

EXAMPLE XVI

Orange juice is a natural source of citrate, ascorbate and fructose. Accordingly, orange juice is an ideal vehicle for delivering calcium and iron minerals in the manner of this invention. By using calcium citrate-malate as the calcium source, and an iron-sugar complex as the iron source, the taste qualities of orange juice are not impaired. A preferred method for preparing fortified orange juice is as follows. The process is equally applicable to the preparation of other juice beverages, so long as the citrate and/or citrate-ascorbate levels are properly adjusted; fructose may optionally be added.

The preferred overall method for preparing the liquid compositions herein involves preparing premix solutions of the calcium and iron complexes (see Examples I–VIII above) and admixing the premixes to the liquid compositions. The following discussion of this method will generally be with regard to formation of orange juice beverages and juice concentrates, which are highly preferred fruit juice products according to the present invention. However, this method can also be used to prepare iron- and calcium-supplemented beverages and concentrates, especially those based on other citrus juices such as grapefruit juice, noncitrus juices such as apple juice, as well as mixtures of juices.

In general, an acid component comprising citric acid and malic acid is typically dissolved in the appropriate quantity of water. (If desired, fruit juice or concentrated fruit juice such as lemon juice can be used to supply a portion of the acids.) Generally, this acid component comprises from 0 to about 90% by weight citric acid and from about 10 to 100% by weight malic acid. For orange juice, this acid component typically comprises from about 20 to about 90% by weight citric acid and from about 10 to about 80% by weight malic acid. Preferably, this acid component comprises from about 5 to about 60% by weight citric acid and from about 40 to about 95% by weight malic acid. (For noncitrus juices such as apple juice, this acid component typically comprises from about 5 to about 80% by weight citric acid and from about 20 to about 95% by weight malic acid, and preferably comprises from about 20 to about 50% by weight citric acid and from about 50 to about 80% by weight malic acid.) As a rule, the ratio of these acids is selected to provide optimum flavor character in the juice.

Once the solution containing the dissolved acids is formed, a source of calcium is then added. Calcium carbonate ($CaCO_3$) is a preferred calcium source. This calcium source leads to the greatest and most rapid initial solubilization of calcium and causes the least amount of off-flavor generation. Calcium hydroxide [$Ca(OH)_2$] and calcium oxide (CaO) are also acceptable calcium sources, but can cause more off-flavor generation than calcium carbonate. The weight ratio of total acids to calcium added in the solution is typically from about 0.5 to about 12. Preferably, this weight ratio is from about 1 to about 6.

Addition of calcium carbonate, calcium oxide, or calcium hydroxide to the aqueous solution of acids provides a premix containing soluble and solubilizable calcium. This is due to the fact that highly soluble calcium citrate and malate species such as CaHcitrate, $Ca(H_2citrate)_2$, and CaHmalate are formed in the solution due to the reaction between the calcium source and the acids. Without added stabilizers, the highly soluble calcium citrate species are stable in the premix solution for periods up to only about a few hours. After this short period of time, the highly soluble citrate species tend to disproportionate to the corresponding acid and the more thermodynamically stable, insoluble calcium citrate salts, such as $Ca_3 citrate_2$.

To improve the stability of the more soluble calcium malate and especially citrate species in the premix solution, it is preferred in the method of the present invention to include a premix stabilizer. Materials which can complex with calcium and/or act as crystallization inhibitors are useful as premix stabilizers. These materials include sugars, such as sucrose, glucose, fructose, high fructose corn syrup, invert sugar, and polysaccharides such as pectin, algins, hydrolyzed starches, xanthan gum, and other edible gums. Concentrated juices which naturally contain both sugars and polysaccharides are particularly suitable premix stabilizers. Preferred premix stabilizers are sucrose and high fructose corn syrup (especially for extended juice products) and concentrated orange juice having a sugar content of from about 35° to about 80° Brix whose source is described hereafter.

The premix stabilizer can be added immediately after the calcium source is added to the aqueous solution containing the acids. (When calcium carbonate is the calcium source, carbon dioxide evolution is preferably allowed to substantially cease before the premix stabilizer is added.) However, if desired, the premix stabilizer (especially in the case of sugars and concentrated juice) can be added to the aqueous solution of the acids prior to addition of the calcium source. The amount of premix stabilizer included in the premix solution typically depends upon the stabilizer used. When sugars are used as the premix stabilizer, they are typically added in an amount sufficient to provide a sugar content of from about 2° to about 40° Brix. When polysaccharides are used, the amount can vary widely, but is typically from about 0.01 to about 0.5% on a weight/volume basis. When concentrated juice is used as the premix stabilizer, it is typically included in an amount sufficient to provide a sugar content of from about 2° to about 40° Brix (preferably from about 2° to about 24° Brix).

The premix solution of solubilized calcium is typically prepared in a batch-type fashion, as in the description above, at room temperature. However, this premix solution can also be prepared in a continuous fashion. In this continuous method, the ingredients (water, acids, calcium source and optional premix stabilizer) are constantly metered together to form the premix solution. The level at which the ingredients are metered is adjusted, as necessary, to insure appropriate solubilization of the calcium in the premix solution and to provide the appropriate acidity.

Separately, a premix solution of the iron-sugar complex is prepared. In general, this solution is somewhat simpler to prepare than the calcium citrate-malate solution, above, since precipitation is not a major problem. Thus, a calcium-sugar reaction product is treated with an iron (preferably iron II) source, and the reaction product is neutralized with a carboxylic acid, in the manner of Example II, above.

The premix solution containing the solubilized and solubilizable calcium and the premix containing the solubilized iron are combined in a mix tank with chilled (e.g., below about 4.4° C.) concentrated orange juice having a sugar content of from about 35° to about 80° Brix (preferably from about 60° to about 70° Brix), orange juice aroma and flavor volatiles, plus other orange juice materials such as pulp and peel oils, to provide iron- and calcium-supplemented orange juice products. The particular proportions of premix solution, concentrated juice, aroma and flavor volatiles, pulp and peel oils used will depend upon a number of different factors, including the type of orange juice product involved (single-strength juice beverage or juice concentrate). For example, iron- and calcium-supplemented 42° Brix orange juice concentrates can be prepared by combining 65 parts concentrated orange juice (65° Brix), 5 parts pulp, 15 parts of an aroma/flavor concentrate, 0.4 parts peel oil with the 15 parts Fe/Ca premix. Similar single-strength juice beverages can be prepared by appropriate variation of the amounts of concentrated orange juice, pulp, aroma/flavor concentrate, peel oil and premix solutions, as well as the inclusion of water.

Juice compositions and other beverages are preferably formulated at a pH below about 4, generally about 3.7-4.0, for reasons of microbial stability.

After the iron- and calcium-supplemented orange juice product is obtained, it is then filled into cans, cartons, bottles or other appropriate packaging. In the case of orange juice concentrates, these products are typically frozen after being filled into cans.

EXAMPLE XVII

It will be appreciated that the addition of citric and ascorbic acids to juices deficient in these materials, e.g., apple juice and pear juice, allows the juices to be fortified with calcium and iron. Alternatively, these juices can be fortified with calcium, alone, but with the advantage that the calcium no longer interferes with the bioavailability of iron ingested from other dietary sources. A calcium-fortified pear juice is as follows:

| Ingredient | Amount |
| --- | --- |
| Calcium citrate-malate | 1000 mg |
| Citric acid | 200 mg |
| Ascorbic acid | 100 mg |
| Pear juice | 150 g |

Because of its low cost and low flavor impact, apple juice is often used as a "base" from which fruit-flavored beverages can be prepared. The present invention provides a means whereby such apple-based beverages and confections can be fortified with calcium, iron, and mixtures thereof. The following examples illustrate this aspect of the present invention.

EXAMPLE XVIII

A frozen confection comprises the following:

| Ingredient | Amount |
| --- | --- |
| Apple juice | 200 g |
| Calcium citrate-malate | 2000 mg |
| Citric acid | 300 mg |
| Synthetic grape flavor | 130 mg |
| Colorant (concord grape) | as desired |

The liquid composition is prepared, colored to a rich purple, and frozen to provide a nutritious frozen confection.

EXAMPLE XIX

The product of Example XVIII is modified by the addition of 50 mg iron II sucrose ascorbate to provide iron and calcium supplementation, concurrently.

| Ingredient | Amount |
| --- | --- |
| Fe II sucrose malate | 30 mg |
| Apple juice | 150 g |
| Synthetic pineapple flavor | 15 mg |
| Citric acid | 200 mg |

What is claimed is:

1. A method for enhancing the bioavailability of calcium and iron when conjointly administered in a human or lower animal, comprising co-administering
   a) iron II or iron III mineral source;
   b) a calcium mineral source;
   c) citrate, tartrate, or a combination thereof;
   d) ascorbate; and
   e) fructose;
   wherein said composition has: a fructose to calcium weight ratio of between about 20 to about 160; an ascorbate to iron weight ratio of between about 10 to about 50; and a tartrate to iron weight ratio of between about 200 and about 4000 or a citrate to iron weight ratio of between about 200 and about 2000 or a (citrate plus tartrate) weight ratio of from about 200 to about 4000 wherein the citrate to iron weight ratio is less than about 2000.

2. A method according to claim 1 wherein the iron is in the II oxidation state.

3. A method according to claim 2 wherein the iron is a member selected from the group consisting of iron II sulfate or an iron II sugar complex.

4. A method according to claim 3 wherein the iron II sugar complex is a member selected from the group consisting of iron sucrate-malate, iron fructate-malate, iron sucrate-citrate, iron fructate-citrate, iron sucrate-ascorbate, iron fructate-ascorbate, and mixtures thereof.

5. A method according to claim 1 wherein the calcium source is a member selected from the group consisting of calcium carbonate, calcium oxide, calcium hydroxide, calcium chloride, calcium phosphate, and calcium citrate malate.

6. A method according to claim 5 wherein the calcium source is calcium citrate malate.

7. A method according to claim 1 wherein the calcium source is calcium citrate malate and wherein the iron source is an iron sugar complex.

8. A method according to claim 7 wherein the iron sugar complex is an iron II sugar complex which is a member selected from the group consisting of iron sucrate-malate, iron fructate-malate, iron sucrate-citrate, iron fructate-citrate, iron sucrate-ascorbate, iron fructate-ascorbate, and mixtures thereof.

* * * * *